Patented Nov. 16, 1948

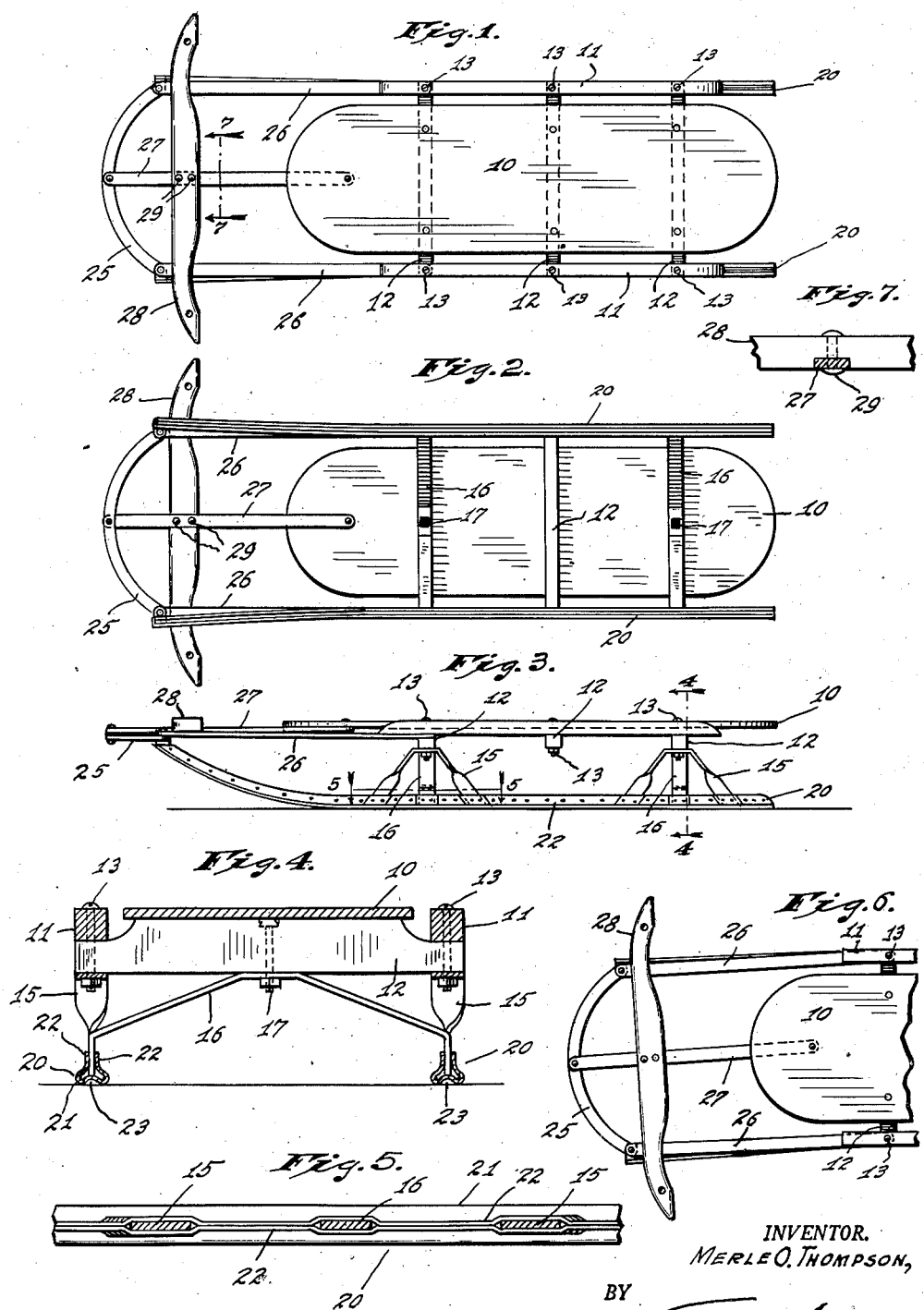

2,453,767

UNITED STATES PATENT OFFICE 2,453,767

SLED RUNNER

Merle O. Thompson, Seymour, Ind.

Application August 14, 1946, Serial No. 690,407

6 Claims. (Cl. 280—12)

My invention relates to sleds, and more particularly to that type of sled having metal runners which can be flexed by appropriate control mechanism to effect steering. Heretofore it has been the common practice to make the runners of such sleds of steel rolled into a special inverted T-shaped cross-section. This material is relatively expensive, and recently has been difficult to obtain.

It is an object of my invention to provide a sled-runer which can be produced at low expense out of readily available material. A further object of my invention is to provide a low-cost sled runner which will be strong and durable and which will satisfactorily withstand the stresses imposed upon it in repeated flexing. Another object of my invention is to produce a simple and improved means for flexing the runners of a steerable sled.

In carrying out my invention, I form each sled runner of a sheet-metal strip bent along longitudinal lines to provide, in cross-section, a base and two generally parallel flanges extending upwardly from such base throughout the length of the runner. Brackets and braces for attaching the runners to the body of the sled are received and secured between the upwardly extending flanges which, between such brackets and braces, are secured together. For the purpose of flexing the runners and thereby guiding the sled, the front ends of the two runners are interconnected by a rigid cross member. A guide link pivotally connected at its two ends to the sled-body and such cross member has rigidly secured to it at an intermediate point a transversely extending guide bar to which the steering effort is applied in conventional fashion.

The accompanying drawing illustrates my invention: Figs. 1 and 2 are respectively top and bottom plan views of a sled; Fig. 3 is a side elevation of the sled; Fig. 4 is a transverse vertical section on the line 4—4 of Fig. 3; Fig. 5 is a horizontal section on the line 5—5 of Fig. 3; Fig. 6 is a fragmental top plan view of the sled showing the runners flexed; and Fig. 7 is a fragmental section on the line 7—7 of Fig. 1.

The body of the sled shown in the drawing comprises a platform 10 and a pair of side rails 11, all conveniently of wood, held in spaced relation by means of cross members 12, shown as three in number. The platform 10 may be secured to the cross members by rivets or screws, but the side rails are desirably secured to the cross members by bolts 13. The bolts 13 associated with the front and rear cross members 12 are also employed to secure thereto runner-mounting brackets 15. Each of such brackets is conveniently formed of a metal strip bent to provide a horizontal upper portion held against the lower surface of the associated cross member 12 by one of the bolts 13 and two downwardly extending oblique legs each of which is twisted intermediately to bring the lower ends into a common vertical plane. A cross brace 16 secured at its midpoint to each of the front and rear cross members 12 by a bolt 17 extends transversely of the sled and has each of its ends bent downwardly into the common plane of the lower ends of the brackets 15.

Each of the sled runners 20 is formed of a strip of sheet-metal bent along longitudinal lines into a cross-section generally like that illustrated in Fig. 4. That is, each strip is bent to provide a laterally extended base 21 and a pair of flanges 22 which extend upwardly in spaced relation between the lateral limits of the base 21. Desirably, the base is formed to provide in its lower surface a longitudinally extending groove 23 for the purpose of obtaining a more effective contact with the surface over which the sled moves.

In accordance with this invention, the lower ends of the brackets 15 and the down-bent ends of the braces 16 are received between the flanges 22 of the runners 20, as will be clear from Figs. 4 and 5. The ends of the brackets and braces are secured to the flanges 22, as by the spot-welding indicated in Fig. 3 or in any other convenient manner. Between the bracket-ends and brace-ends, the flanges 22 are offset into contact with each other and secured together as indicated in Fig. 5.

The front end of each runner 20 is bent upwardly and secured to one end of a cross bar 25 and to the front end of a link 26 which extends rearwardly to the front cross member 12 and is pivotally attached thereto by means of the bolt 13. A guide link 27 disposed generally on the longitudinal center-line of the sled has its ends pivotally secured respectively to the cross bar 25 and the platform 10 and carries at an intermediate point a transversely extending guide bar 28. The guide bar 28 is rigidly attached to the guide link 27, conveniently by the latter's being tightly received in a groove on the under surface of such guide bar and held in such groove by rivets 29 or other attaching means which will hold it firmly in position. Desirably, the cross bar 25 is bent in a horizontal plane, as clearly indicated in Figs. 1, 2, and 6, so that the point at which it is attached to the guide link 27 will lie well ahead of its points of connection with the links 26.

The runners 20, being formed of sheet metal, may be easily and economically constructed. Because of their depth and the reinforcement provided by the lower ends of the brackets and braces to which they are secured, the runners possess adequate strength and rigidity over their horizontal, or load-supporting, portions. At the same time, the front ends of the runners are sufficiently flexible to permit them to be bent to guide the sled. Such bending of the runners is effected by applying a forwardly directed effort to one end or the other of the guide bar 28. Because of the rigid connection between the guide bar 28 and the guide link 27, such a forwardly directed effort will cause the guide link to swing about its axis of interconnection with the platform 10 to force the cross bar 25 and the front ends of the runners 20 to one side or the other, depending upon that end of the guide bar to which the steering effort is applied.

I claim as my invention:

1. In a sled, a rigid body, a pair of runners, and brackets interconnecting said body and runners, each of said runners being formed of sheet metal bent along longitudinal lines to provide a laterally extended base and upwardly projecting, continuous flanges lying within the lateral limits of said base, the lower ends of said brackets being received between and secured to said flanges, and those portions of said flanges between the lower bracket-ends being offset into contact with each other and secured together.

2. The invention set forth in claim 1 with the addition that each of said brackets is formed of flat material having an upper portion and at least one leg extending downwardly therefrom, said upper portion being disposed in a horizontal plane and said leg being twisted to bring its lower end into a vertical plane longitudinal of the sled.

3. The invention set forth in claim 1 with the addition that each of said brackets is formed of flat material having an upper portion and two legs extending downwardly from opposite ends of said upper portion, each of said two legs being twisted to bring their lower ends into a common vertical plane longitudinal of the sled.

4. The invention set forth in claim 1 with the addition that said base is formed to provide a downwardly presented, longitudinally extending control groove.

5. A sheet-metal sled runner having a laterally extended base and two flanges projecting upwardly from said base in parallel relation, said flanges having portions which are in contact with each other and secured together and other portions which are spaced apart to form pockets for the receipt of members by which the runner may be attached to a sled-body.

6. The invention set forth in claim 5 with the addition that said base is formed to provide a downwardly presented, longitudinally extending central groove.

MERLE O. THOMPSON.

REFERENCES CITED

The following references are of record in the file of this patent:

UNITED STATES PATENTS

| Number | Name | Date |
|---|---|---|
| 905,704 | Johnson | Dec. 1, 1908 |
| 938,300 | Coleman | Oct. 26, 1909 |
| 2,037,076 | Kidder | Apr. 14, 1936 |

FOREIGN PATENTS

| Number | Country | Date |
|---|---|---|
| 103,793 | Switzerland | Mar. 1, 1924 |